(12) United States Patent
Huber

(10) Patent No.: US 6,561,249 B2
(45) Date of Patent: May 13, 2003

(54) PRESS DEVICE FOR COATING WORKPIECES, ESPECIALLY PIECES OF FURNITURE, ON MULTIPLE SIDES

(75) Inventor: Reinhard Huber, Freundenstadt-Dietersweiler (DE)

(73) Assignee: Robert Burkle GmbH, Freudenstadt (DE)

( * ) Notice: Subject to any disclaimer, the term of this patent is extended or adjusted under 35 U.S.C. 154(b) by 33 days.

(21) Appl. No.: 09/901,177

(22) Filed: Jul. 9, 2001

(65) Prior Publication Data

US 2002/0003029 A1 Jan. 10, 2002

(30) Foreign Application Priority Data

Jul. 10, 2000 (DE) .......................... 100 33 246

(51) Int. Cl.$^7$ ............................... B30B 15/00
(52) U.S. Cl. .................... 156/581; 269/21; 269/266; 269/303
(58) Field of Search ................. 156/475, 479, 156/580, 581, 583.1; 269/20, 21, 266, 303

(56) References Cited

U.S. PATENT DOCUMENTS

| | | | | | |
|---|---|---|---|---|---|
| 3,664,236 A | * | 5/1972 | Malott | ........................... | 92/26 |
| 4,684,113 A | * | 8/1987 | Douglas et al. | ............... | 269/21 |
| 4,723,766 A | * | 2/1988 | Beeding | ...................... | 269/21 |
| 5,013,178 A | * | 5/1991 | Baker et al. | ................ | 403/330 |
| 5,120,033 A | * | 6/1992 | Shoda | ......................... | 269/21 |

FOREIGN PATENT DOCUMENTS

| | | |
|---|---|---|
| DE | 197 18 561 A1 | * 11/1998 |
| DE | 198 36 219 A1 | * 2/2000 |

* cited by examiner

*Primary Examiner*—James Sells
(74) *Attorney, Agent, or Firm*—Volpe and Koenig, P.C.

(57) ABSTRACT

A press device for coating table board-shaped pieces of furniture on their upper side and side surfaces, whereby the workpieces lie next to each other on a supporting system that has many supporting bolts distributed in a grid-like manner, which can be adjusted between a passive position out of contact with the workpieces and a coating position that supports the workpieces. An elastic membrane is arranged above the supporting bolts, on which the workpieces can be placed. The elastic membrane functions to support the coating film during the coating operation.

14 Claims, 3 Drawing Sheets

PRESS DEVICE FOR COATING WORKPIECES, ESPECIALLY PIECES OF FURNITURE, ON MULTIPLE SIDES

BACKGROUND

The invention involves a press device for multi-sided coating of workpieces, especially table board-shaped pieces of furniture, on their upper side and side surfaces, whereby the workpieces lie next to each other on a supporting system that has many supporting bolts distributed in a grid-like manner, which can be adjusted between a passive position out of contact with the workpieces and a coating position that supports the workpieces.

The main application of the invention is the coating of three-dimensional pieces of furniture that should not only be coated on their front, but also on the surrounding side surfaces, with a plastic film, a veneer, or the like. In the following, the discussion involves only a film, without intending to be restrictive to the invention. The coating is done by the application of heat and pressure in a press. So that its capacity can be used optimally, for the most part, numerous workpieces are fed together on a shared pallet to the supporting system of the press, and are coated there together. After leaving the press, the workpieces are then separated by cutting them out from the attached film.

So that the plastic film can be properly placed not only on the upper side of the workpieces, but also on the side surfaces that are set back from it, especially on its lower edge, the workpieces must be separated at a distance from their substrate. This is done for the most part by supporting bolts in the form of lifting bolts, which travel into an upper position and in this way lift up the workpieces. It is essential in the process that the lifting bolts that are lifted into the upper coating position are only those which are covered completely by a workpiece, while the lifting bolts that are not covered or not completely covered stay in the lower resting position, so that the coating process is not impaired on the side edge surfaces.

Independently from that, it is also disruptive if free-standing, uncovered supporting bolts are in their upper position during the coating operation, because these bolts are also coated by the film at the same time and the film must then be separated again with difficulty and in a time-consuming manner.

In the state of the art, numerous press devices have already been described, which take into account the aforementioned set of problems. As examples, reference is made to the patents DE-A-197 18 561 and 198 36 219 of the same applicant.

In the majority of cases, these press devices operate absolutely flawlessly. However, there are still quality problems that result individually in the coating of the corner areas. Tests by the applicant have revealed that under unfavorable circumstances, an over-stretching and tearing of the film can occur locally here.

SUMMARY

The object of the invention presented here is therefore to create a remedy for this, i.e. to ensure a reliable and lasting coating especially on the side edges and corners even in the case of unfavorable conditions.

This object is achieved according to the invention in that above the supporting bolts, an elastic membrane is arranged on which the workpieces can be supported.

The invention is based on the discovery that the set of problems described is not only influenced by the extent of the stretching, but also by the speed at which the film is stretched. This stretching speed is now reduced according to the invention by the intermediately placed elastic membrane, since in the edge area of the workpieces, where the film is pulled into the intermediate space not only between adjacent workpieces, but also between adjacent supporting bolts, the membrane functions as a support. It can be said that the membrane acts in these areas as a stretching brake and a guide for the film.

Another important aspect of the invention is provided in that the membrane prevents a direct contact of the heated film with the cold substrate of the workpieces, in particular the pallet; and the film can thus not be chilled in the greatly stretched areas and keeps its elastic properties to a greater extent than in the prior art.

So that the membrane must not be re-aligned for each coating operation, it is recommended that it is attached to the press device or a removable pallet with a grid-like perforated board. In this manner, a slight pre-tension is sufficient so that a fold formation in the membrane is prevented.

It is especially preferred to attach the membrane on its edge to the surrounding frame of the pallet in such a way that it runs at a certain distance above the perforated board of the pallet, and especially at the approximate height occupied by the upper ends of the lifting dies, when the lifting dies are in the coating position. Instead of this, the membrane can however also be supported on the perforated board and be attached to the edge of the perforated board by clamping rails or the like, in particular, if work is done with horizontally adjustable supporting dies.

An expedient further embodiment of the invention provides that the membrane is made of a transparent material. In this way, it can be recognized through the membrane from above where the positions of the supporting bolts are and the workpieces can be positioned accordingly. Moreover, the transparence of the membrane has the advantage that for supporting systems with bolts that can be moved horizontally, it can be recognized from above which bolts are projecting on the edge of the workpieces and accordingly must be pushed out of the way. Pushing them out of the way can be done in spite of the membrane, since it consists of a sufficiently flexible material, for example, out of silicone, rubber, or the like.

Since the membrane is exposed to a certain amount of wear, it is recommended to attach it so that it can be replaced. If the membrane is mounted onto a pallet, then it can be made in multiple parts, so that a replacement is possible without a great expense.

Normally, the pallet is a separate part, which is covered outside of the pressing operation with the workpieces to be coated and then placed into the press device. The use of the membrane according to the invention is, however, also possible, of course, if the pallet is a fixed component of the press device.

It is customary to promote the coating operation in such a manner that the space under the film is connected at partial vacuum, so that the film is supported better on the workpiece edges. So that this principle can also be applied for pallets with an integrated membrane, it is recommended to perform the partial vacuum connection of the pallet in such a way that the partial vacuum impingement takes place in the space below the membrane and that the membrane has openings. In this way, the film itself is sucked onto the workpiece edges and the membrane can not speed on ahead.

BRIEF DESCRIPTION OF THE DRAWINGS

Additional characteristics and advantages of the invention will be understood from the following description of a preferred embodiment using the drawings. Shown are.

DETAILED DESCRIPTION OF THE PREFERRED EMBODIMENT(S)

Figure 1:
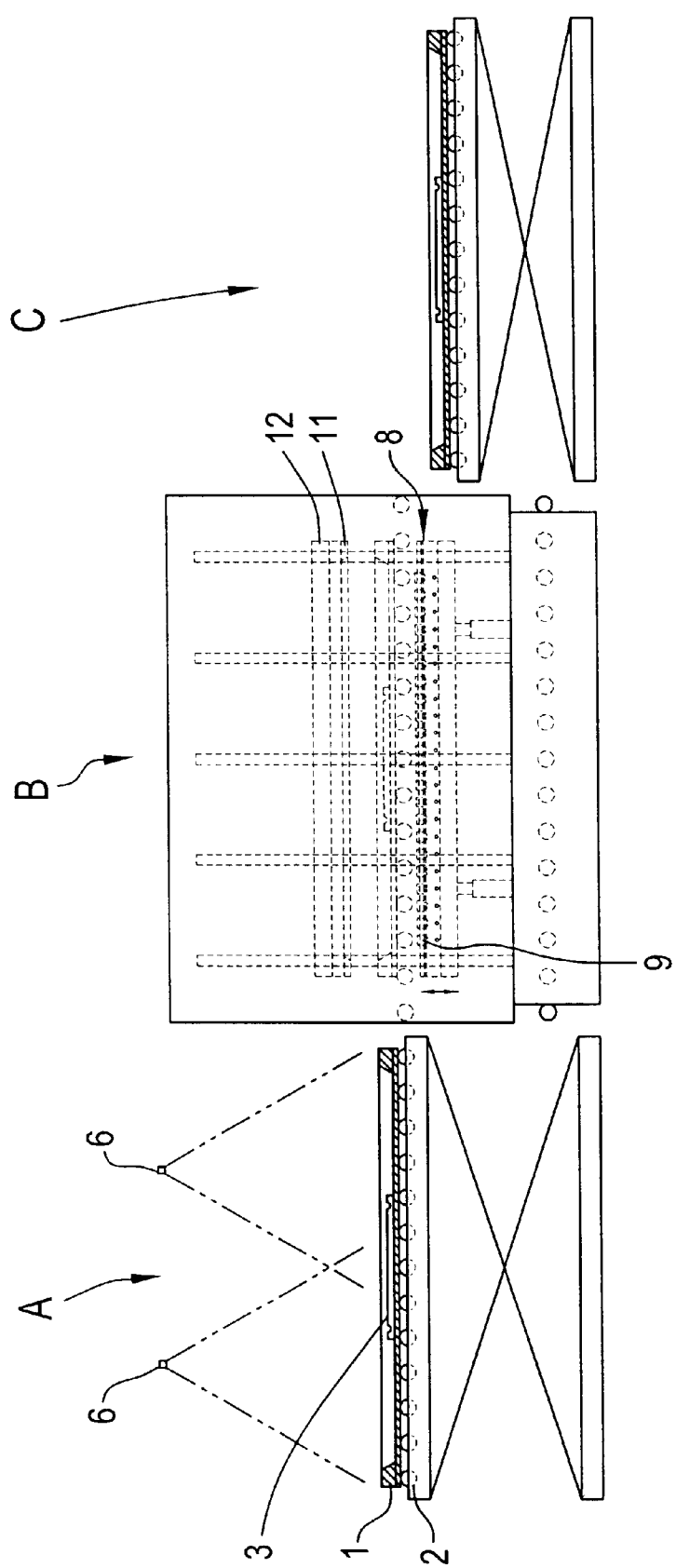
FIG. 1 is a schematic side view of a device according to the invention for coating workpieces.

In FIG. 1, three stations are shown through which a workpiece to be coated travels. This includes a feed area A arranged on the left in FIG. 1, a coating press B arranged in the center of the drawing, and an emptying station C arranged on the right. Within the feed area A, a pallet 1 with a perforated board lies on a transport device 2 in the form of a roller conveyor and carries a workpiece to be coated, which is in the form of a table board-shaped piece of furniture 3. This piece of furniture should be coated on its upper side, which can be profiled as desired, and coated on its four side surfaces—i.e. on all sides with the exception of the underside. Actually, an attempt is made—as opposed to the representation in FIG. 1—to arrange on the pallet 1 many workpieces lying next to each other for simultaneous coating, in order to utilize the capacity of the pallet as well as the coating press to the greatest extent possible. The pieces of furniture must therefore have a certain distance between them, so that the film can also be applied on the side surfaces of the workpieces.

In the upper region of the feed area A, a detector device 6 comprised of several optical sensors is provided, which detects the shape, the dimensions and the position of the individual workpieces 3 and passes them on to a control device (not shown), in order to control lifting bolts 9 (explained in greater detail in the following) in the coating press B. After the detection operation, a film is placed over the pallet and the workpieces located on it, and the pallet is carried into the coating press B.

The transport operation from the feed area A into the press B is done via the transport device 2, for example, a roller conveyor, which positions the pallet 1 in such a way in the press, that the hole pattern in the pallet 1—i.e. the openings 4 in the perforated board 1a of the pallet—lies exactly above the lifting bolts 9 in the press. In this way, the shape and position of the openings 4 correspond to the grid of the lifting bolts 9.

Before the pallet 1 is lowered downwards onto a base plate 5 of the press that supports the lifting bolts in order to place the workpieces on the lifting bolts, only the lifting bolts are driven upwards into the coating position, which are completely covered by a workpiece. Those lifting bolts on the other hand, which stay uncovered or which are only partially covered by a workpiece, stay in their lower position. This selection of the lifting die position is done with the help of the detector device 6 described above which detects the shape, dimensions and position of the individual workpieces on the pallet and creates a placement image from that. This placement image is compared in a computer to the grid of the lifting bolts 9, whereupon the control device controls the lifting bolts 9 in the desired manner.

It does not matter in this process whether all of the lifting bolts 9 are in their upper position and the uncovered or only partially covered lifting dies are then lowered or whether at first all lifting dies are in the lower position and after that, only the completely covered lifting dies are driven higher.

Figure 2:
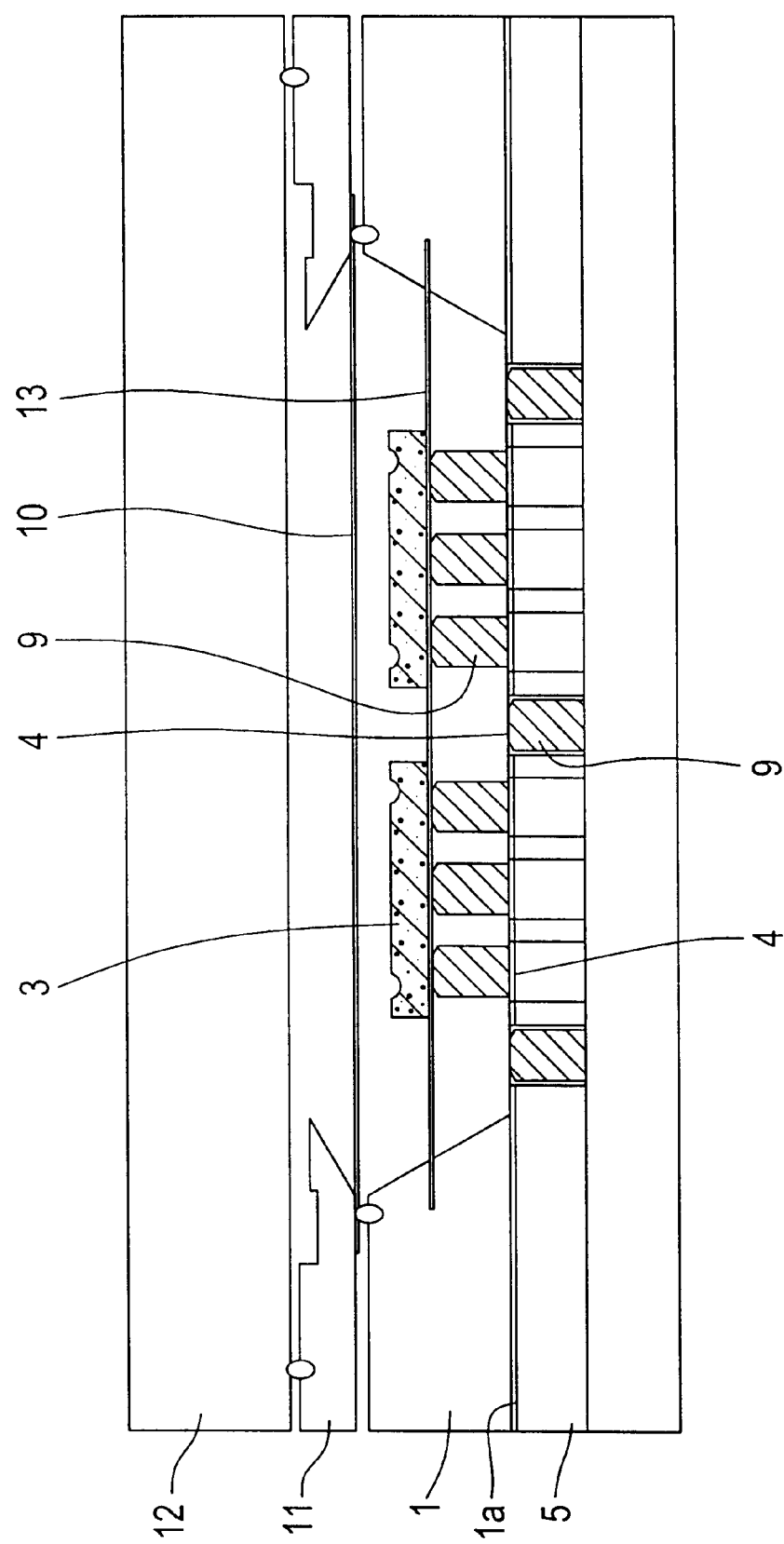
FIG. 2 is an enlarged schematic side view of a support device as a part of the device from FIG. 1.
Figure 3:
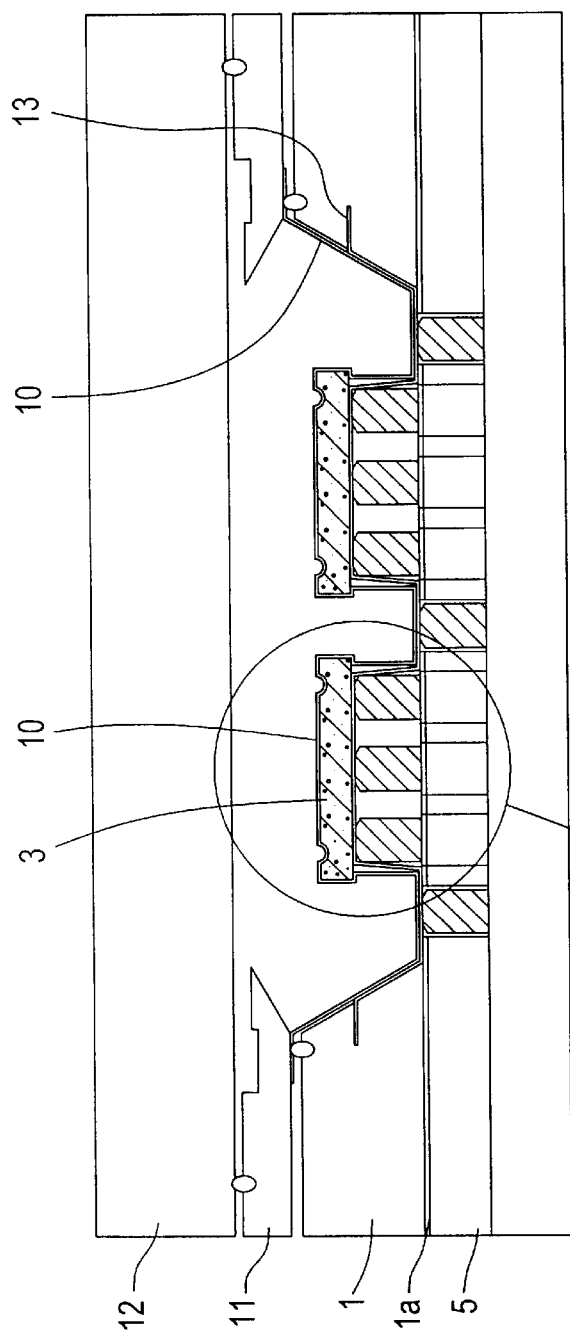
FIG. 3 is the support device from FIG. 2 during the coating operation.
Figure 4:
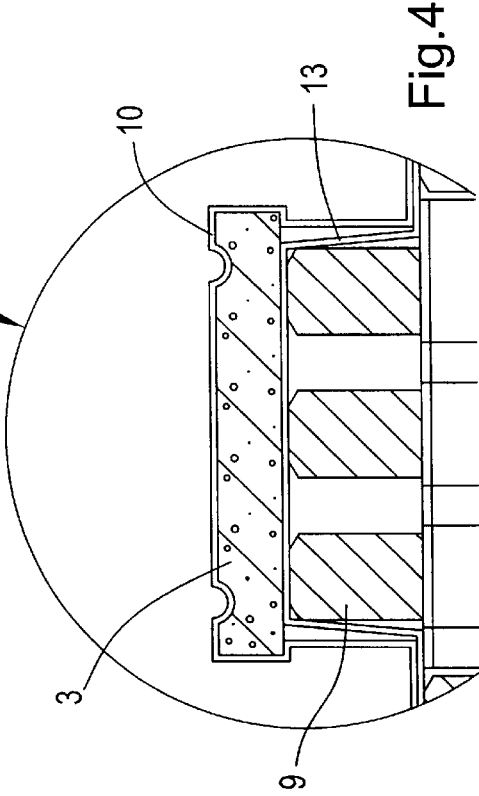
FIG. 4 is an enlarged section from FIG. 3.

As shown further in FIGS. 2 to 4, the pallet 1 carries, on the upper side of its surrounding frame, the film 10, with which the workpieces 3 should be coated. The film is sealed off from the surroundings in the press by a sealing frame 11, which is pressed against the pallet from above. Above the sealing frame 11, a heating plate 12 that can moved vertically is located in order to heat up the film to the required coating temperature. The sealing frame 11 and the heating plate 12 are lowered after the installation of the pallet 1 in the press to the position shown in FIG. 2 and after that, the upper side of the film 10 is impinged with an excess pressure and the lower side is impinged with a partial vacuum. Instead of this, the pallet can also be driven upwards against the sealing frame 11 and the heating plate 12. In this regard, the structure described corresponds to the known state of the art.

It is now essential to the invention that the pallet 1 carries a flexible membrane 13, which extends horizontally over the entire coverage surface of the pallet. This membrane is attached in the described preferred embodiment in the frame of the pallet, but it can be attached just as well to the: perforated board 1a. It is fixedly integrated into the pallet on its outermost circumference and extends between the perforated board 1a and the workpieces 3.

The membrane 13 is so flexible that it hangs through on the perforated board 1a in the feeding station, so that the workpieces 3 can be placed on without problems. Since it is transparent, the workpieces can be aligned optimally relative to the openings 4 in the perforated board 1a.

If the coating is carried out not only through excess pressure in the space above the film 10, but also by partial vacuum in the space below the membrane 13, then a membrane is used with numerous through-openings so that the partial vacuum can spread to the underside of the film 10.

The coating result itself is shown in FIGS. 3 and 4. It can be clearly seen how the film not only rests on the surrounding side surfaces of the workpieces, but also that it dives into the free space above the uncovered dies. This diving into the free space is associated with a great stretching of the film and especially here, the membrane 13 functions to guide and support the film. Since the membrane is also subjected to greater stretching in the process, it builds corresponding supporting forces and functions as a stretching brake for the film. Film tears or film detachments are reliably avoided in this manner.

After coating, the pallet is carried to the emptying station C, where the coated workpieces are cut out of the attached film and separated.

The principle, according to the invention, of the supporting membrane for coating is also to be used in other supporting systems, in which the selection of supporting bolts is done not by vertically moving, but instead, for example, by horizontal moving. A supporting system of this type is known from the patent EP-A-505 668, where the bolts can be moved or pivoted for the adaptation to different workpiece shapes and workpiece sizes in parallel to the supporting surface. Relative to the FIG. 2 as shown, this must be imagined in a manner such that all bolts 9 stay in one and the same plane and are moved horizontally in such a way that they are all concentrated below the workpieces to be coated so that no uncovered or only partially covered lifting dies are left over. In regard to this horizontal movability or pivoting capacity, reference is made in full to the cited patent EP-A-505 668. The horizontal movement of the die out of the workpiece frame area can be done manually from above, since the membrane is sufficiently flexible. The detector device 6 becomes unnecessary in this case.

What is claimed is:

1. Press device for coating workpieces, especially table board-shaped pieces of furniture (3), on multiple sides, comprising a supporting system (5) having a plurality of supporting bolts (9) distributed in a grid-like manner upon which the workpieces (3) lie next to each other, the supporting bolts can be adjusted between a passive position out of contact with the workpieces (3) and a coating position that supports the workpieces (3), whereby an elastic membrane (13) is arranged above the supporting bolts (9), on which the workpieces (3) can be supported.

2. Device according to claim 1, wherein the membrane (13) is located on the press device or on a removable pallet (1) attached to a grid-like perforated board (1*a*) that can be placed in the press device.

3. Device according to claim 2, wherein the pallet (1) has a frame and the membrane (13) has an edge which is attached to the frame.

4. Device according to claim 1, wherein the membrane (13) is transparent.

5. Device according to claim 1, wherein the membrane (13) is comprised of silicone or rubber.

6. Device according to claim 1, wherein the membrane (13) has a thickness of about 0.5 mm to 2 mm.

7. Device according to claim 2, wherein the pallet (1) includes a multi-piece frame so that the membrane (13) can be replaced.

8. Device according to claim 2, wherein the pallet (1) is a separate part that can be placed into the press device.

9. Device according to claim 2, wherein the pallet (1) is a fixed component of the press device.

10. Device according to claim 2, wherein the pallet (1) has a connection for partial vacuum impingement of a space below the membrane (13).

11. Device according to claim 1, wherein the membrane (13) is perforated.

12. Device according to claim 2, wherein the supporting bolts (9) can be moved between a lower, resting position and an upper, coating position, passing through the perforated board (1*a*) of the pallet (1) and lifting the workpieces (3) from the perforated board, the membrane (13) is arranged in an unloaded condition: at a distance above the perforated board (1*a*) of the pallet (1).

13. Device according to claim 12, wherein the distance is selected so that the membrane (13) extends approximately at a height of upper ends of the supporting bolts (9) when the supporting bolts (9) are located in the upper, coating position.

14. Pallet (1) for the press device according to claim 1, comprising a perforated board (1*a*) having an elastic membrane (13) located thereabove on which the workpieces (3) can be placed.

\* \* \* \* \*